Figure 1:
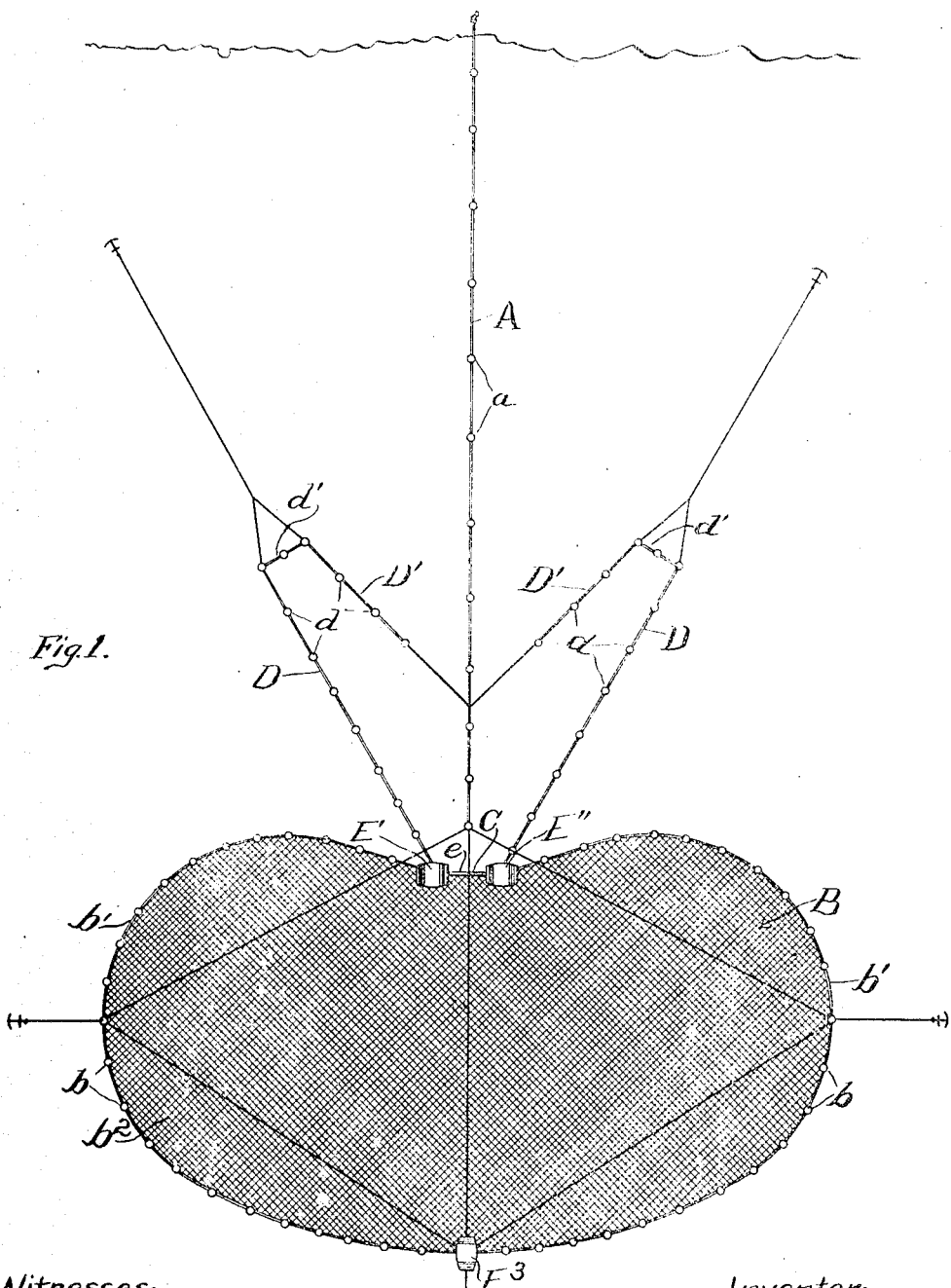

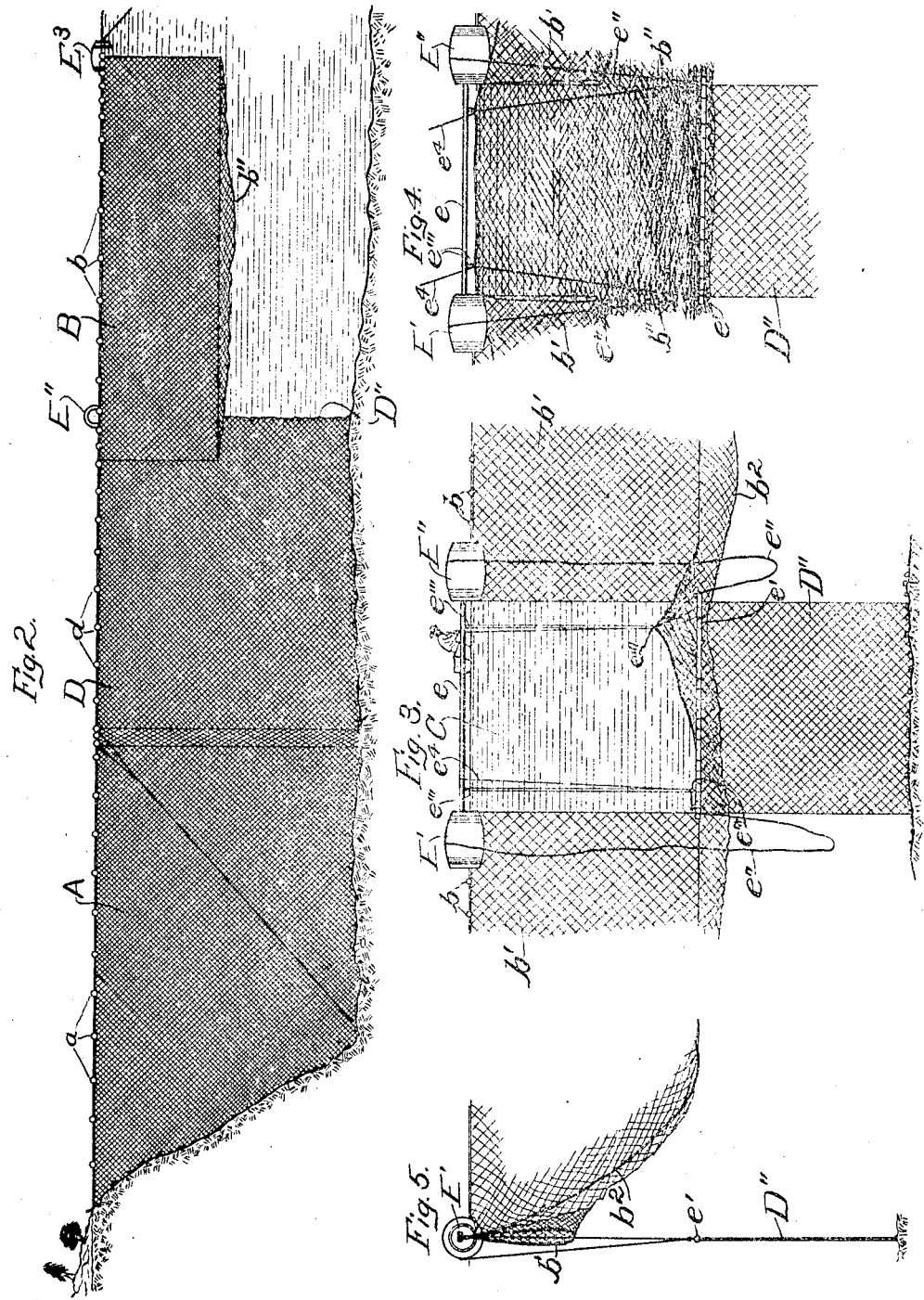

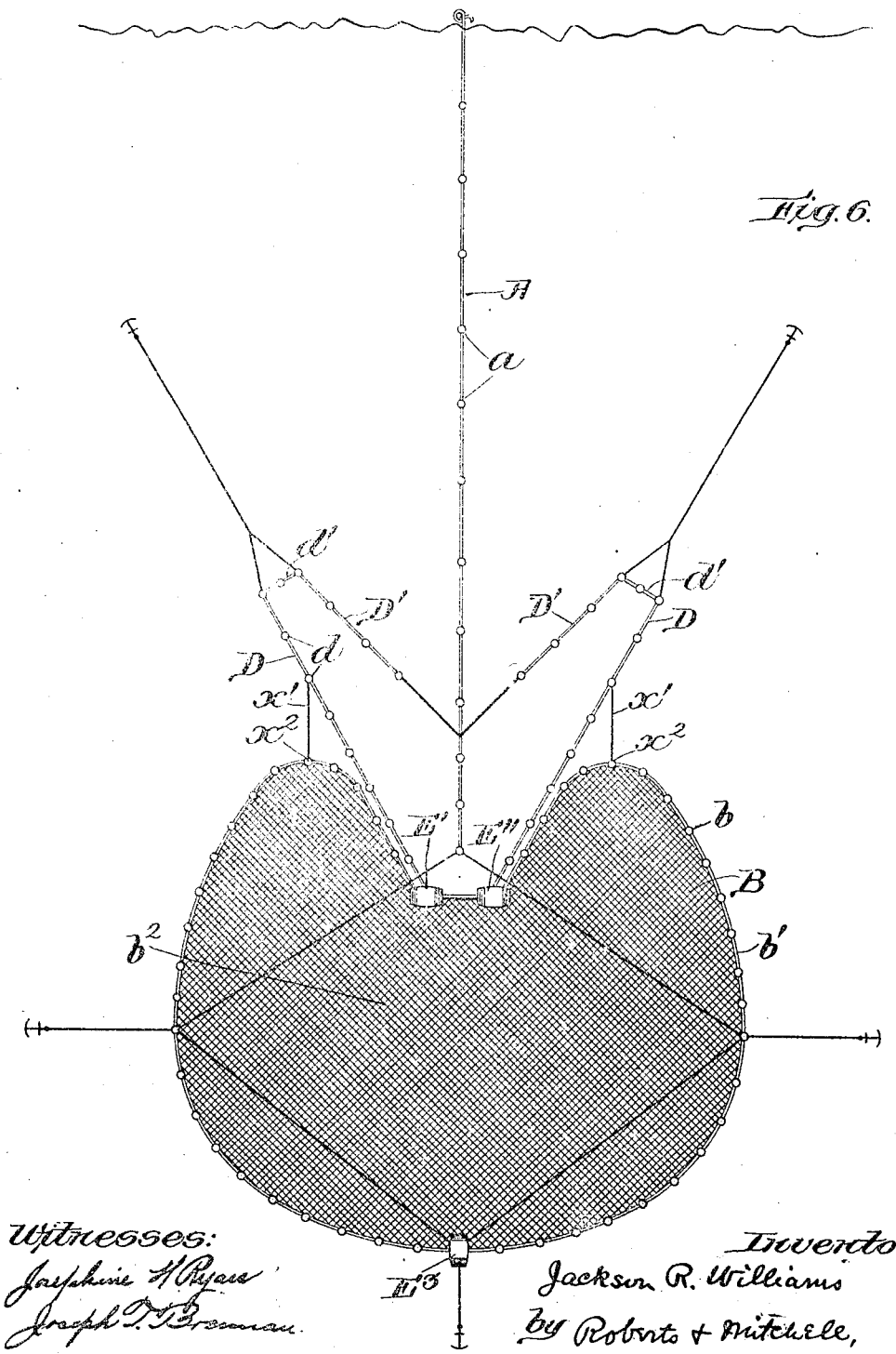

UNITED STATES PATENT OFFICE.

JACKSON R. WILLIAMS, OF PROVINCETOWN, MASSACHUSETTS.

FISH-TRAP.

No. 885,410.  Specification of Letters Patent.  Patented April 21, 1908.

Application filed November 30, 1906. Serial No. 345,679.

*To all whom it may concern:*

Be it known that I, JACKSON R. WILLIAMS, a citizen of the United States, and resident of Provincetown, in the county of Barnstable and State of Massachusetts, have invented new and useful Improvements in Fish-Traps, of which the following is a specification.

My invention has for its object to provide a floating fish trap and consists essentially in a novel arrangement and organization of the parts of the "heart" seines and in a novel organization and arrangement of the pound in its relation to the "heart" and in the means for closing the pound to the exit of fish when it is desired to remove the fish from the pound.

In the drawings, Figure 1 shows in plan my new trap; Fig. 2 shows a side view; Fig. 3 shows the floating pound and bib piece separated from the other parts of the trap; Fig. 4 is the same as Fig. 3 but shows the pound closed; and Fig. 5 is a central section on Fig. 4. Fig. 6 is a plan view of my new trap, showing the floating pound drawn into the preferred position.

From the shore or any desired point the leader net A is floated upon suitable floats $a$ attached to its upper edge, its lower edge resting upon the bottom (see Fig. 2) and from the outer end of the leader net a guy rope is carried forward over a float $E^3$ to an anchor or mooring weight or other suitable abutment and tautened, to keep the leader net A in alinement. Inclosing the outer end of the leader net (see Figs. 1 and 2), is a "heart" D, D', so-called, consisting of an arrangement of nets carried by floats $d$ upon their upper edges, which nets reach to the bottom and flare out from the entrance C of the pound B. At the outer extremity of the sides D of the heart the net is attached to a spreader $d'$ and is made reëntrant by another side D'. The spreader $d'$ is attached by guy ropes to an anchor or other suitable abutment.

The inner ends of the walls D of the heart are secured at their upper edges to barrels or other suitable floats E', E" which are separated by a spreader $e$ and at a suitable point below their upper edges a heavy bar $e'$, preferably of metal, is attached to the inner edges of the wall D directly below the spreader $e$ and serves to spread the inner edges of the walls D of the heart and by its weight or by suitable weights attached to the bar to pull the inner edges of the heart walls straight and from this spreader bar $e'$ depends a bib piece D" which is connected at its edges with the side walls D of the heart and at its lower edge rests upon the bottom. The pound B consists of the side walls $b'$ which are supported at their upper edges by the floats $b$ and the floats E', E", $E^3$, and the bottom $b^2$, all of net of suitable mesh. The walls of the pound are not continuous but terminate closely adjacent to the inner ends of the walls D of the heart, and the bottom of the pound is upon a level with the weighted spreader bar $e'$. The weighted spreader bar $e'$ carries eye bolts at either end through which ropes $e''$ are passed leading to the float directly above and at its lower end attached to the pound net at the junction point between the bottom and the bottom edge and end of the side wall $b'$. At the same point is also attached a small pulley block $e'''$ and a coöperating pulley block $e'''$ secured to the float above and between these two pulley blocks is properly reeved a suitable rope $e^4$.

It will now be obvious, assuming that the leader net extends from the shore outward, that a fish passing along the shore in either direction will encounter the leader net, and being unable to pass under it, will swim outwardly toward the trap. At the extreme outer end, if the fish is a surface fish, he will naturally pass through the entrance C into the pound B and if a bottom fish he will encounter the bib piece D" and will either pass upward through the entrance into the pound B or swim around within the walls D' of the heart until he finally finds the entrance C into the pound B. When it is desired to empty the pound B of the fish therein, the operator releases the return rope $e''$ and by means of the tackle blocks $e'''$ hauls up the bottom $b^2$ of the pound B to the surface, thus closing, with the bottom of the pound B, the opening C between the opposed ends of wall $b'$ of the pound B. Having done this and secured the net in this position, the operators pass around the walls $b'$ hauling them by hand gradually upward and throwing the walls of the pound over the floated upper edges of the wall and thus gradually shallowing the pound B to a suitable depth and this process is carried on until the fish are driven into shallow water at one end where they may be bailed into a boat. The fish having been removed the lifting blocks are released and the rope $e^4$ slackened and the net is restored to its original position by the return haul ropes $e''$.

In Fig. 6 I have shown x the most advantageous form into which the floating pound B may be drawn. When drawn into this shape the fish in following the side walls seeking an exit are less likely to find the passage C.

A cord or cords $x'$ are attached to the upper edges of the side wall of the pound at each side of the opening, as at $x^2$, and the cord is then drawn upon until the walls of the pound are drawn to the desired position. When the desired effect is produced the other end of the cord is secured to the upper edge of one of the "heart" nets. It will be understood of course, that the pound, being made of netting, is perfectly flexible as it lies in the water, and when it is once drawn into any shape rests practically as easily as in any other shape and that no mechanism is required to effect this end, beyond a suitable length of cord.

I claim:

1. A fish trap, comprising a leader net; a "heart" made up of side nets D and reëntrant nets D'; a bib piece; the leader net, heart nets and bib piece extending to the bottom; a pound, made up of a bottom and a side wall having an opening upon one side; the leader net entering the base of the "heart" to guide the fish into the "heart," the "heart" walls and the bib piece converging to the opening in the wall of the pound to guide the fish into the pound.

2. In a fish trap the combination of a "heart;" a bib piece and a "pound" made up of a bottom and side wall and having an opening in its side wall, the "heart" walls and the bib piece extending to the bottom, the "heart" and the bib piece converging to the opening in the wall of the "pound" to guide the fish into the "pound" and means to raise the bottom of the "pound" adjacent to the opening in the wall of the "pound" to the surface of the water, to close said opening.

3. In a fish trap, the combination of a "heart" made up of nets D, D'; a bib piece; a "pound" B made up of a bottom $b^2$ and side wall $b'$ and having an opening in its side wall to which the heart and bib piece converge to guide the fish to the opening; a weighted spreader bar $e'$ supported by the wall D of the "heart" adjacent the lower side of the opening in the wall $b'$ of the "pound"; floats E' E", carrying the opposed ends of the wall $b'$ at the opening; and tackles connecting the bottom of the "pound" at the opening in the wall $b'$ with the floats E', E", to raise the bottom of the "pound" to close the opening in its wall.

Signed by me at Boston, Massachusetts this 20th day of November, 1906.

JACKSON R. WILLIAMS.

Witnesses:
E. D. CHADWICK,
C. D. WOODBERRY.